United States Patent [19]

Long

[11] 4,154,471
[45] May 15, 1979

[54] VEHICLE FRAME HAVING TORSIONAL CROSS MEMBERS

[75] Inventor: Elton B. Long, Burlington, Iowa

[73] Assignee: J. I. Case Company, Racine, Wis.

[21] Appl. No.: 832,179

[22] Filed: Sep. 12, 1977

[51] Int. Cl.² .......................................... B62D 55/00
[52] U.S. Cl. .................................................. 296/204
[58] Field of Search ............... 296/28 F, 28 R, 106 R; 180/71, 73, 75, 9.2

[56] References Cited

U.S. PATENT DOCUMENTS

| | | | |
|---|---|---|---|
| 3,645,350 | 2/1972 | Deli | 180/9.2 |
| 3,746,387 | 7/1973 | Schwenk | 296/28 F |
| 3,904,237 | 9/1975 | Barenyi | 296/28 F |

Primary Examiner—Philip Goodman
Attorney, Agent, or Firm—Dressler, Goldsmith, Clement, Gordon & Shore, Ltd.

[57] ABSTRACT

A frame structure for a vehicle which includes two side members connected together by a torsional cross member and at least one other cross member is disclosed. The torsional cross member is secured to each of the side members in the rear portion of the frame, and cooperates with the side members to provide a liquid-impervious housing for the rear axle assembly of the vehicle. Because the torsional cross member has components oriented substantially parallel to and substantially perpendicular to the length of the side members, it provides the frame with multi-dimensional rigidity. In addition, because the torsional cross member combines the function of two members in prior art frame structures, the frame structure of the present invention has a lower center of gravity and is lighter than prior art frame structures.

8 Claims, 5 Drawing Figures

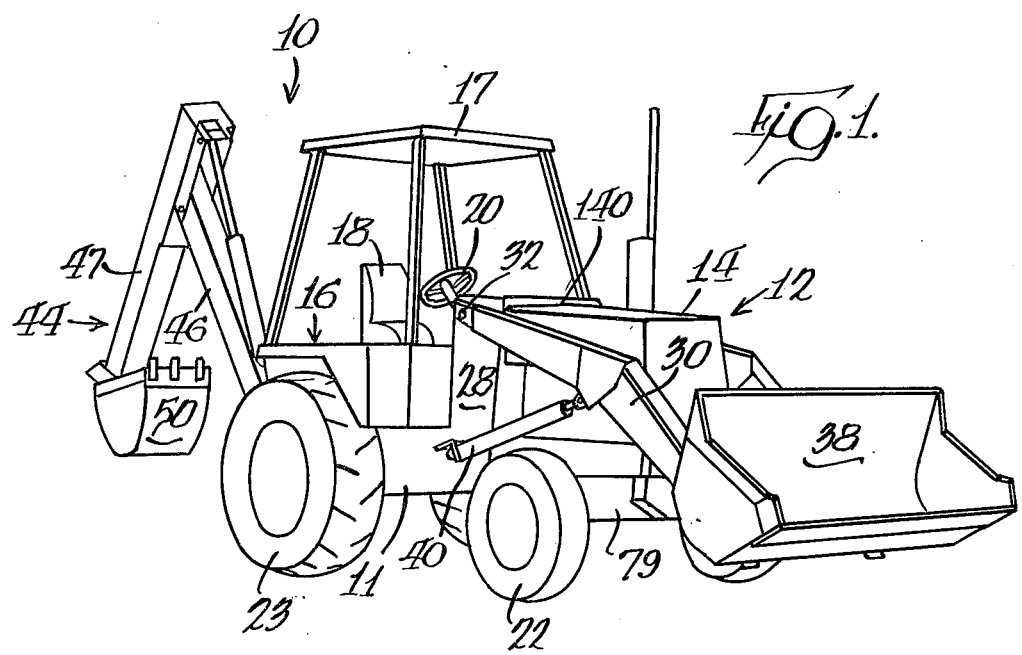
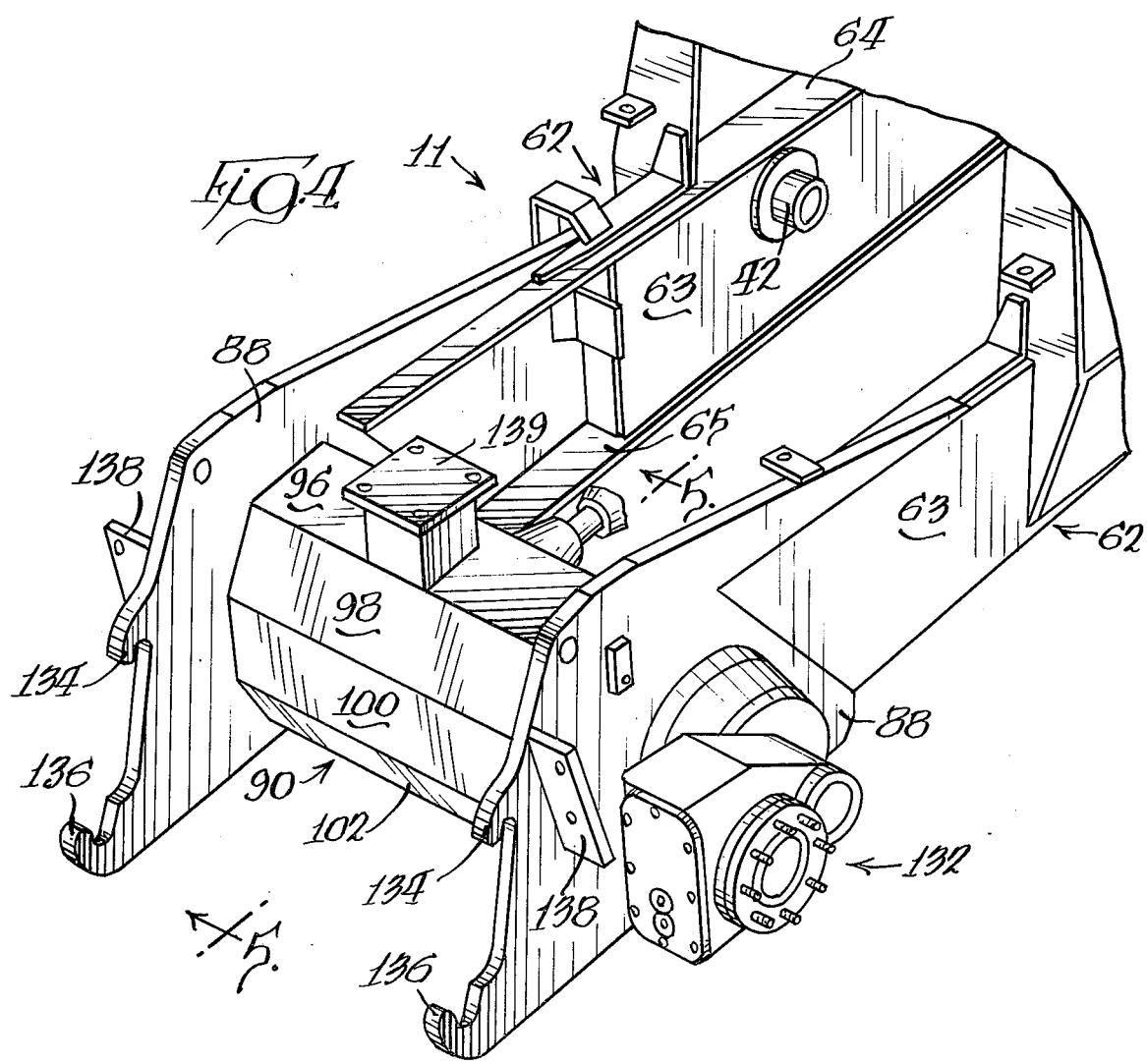

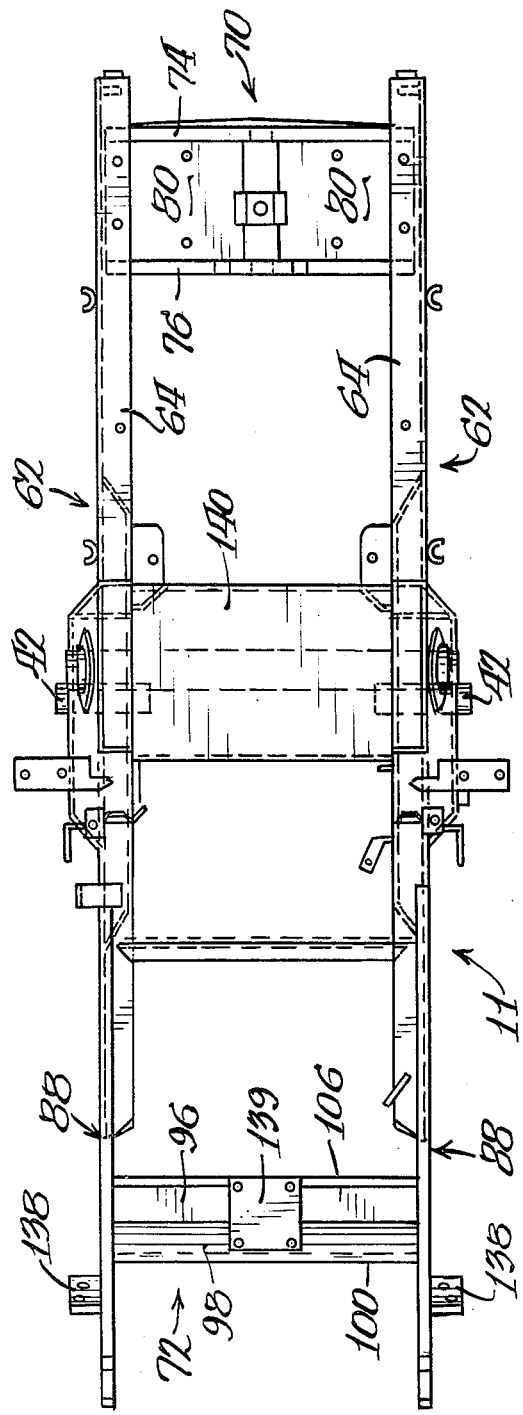

VEHICLE FRAME HAVING TORSIONAL CROSS MEMBERS

BACKGROUND OF THE INVENTION

The present invention relates to the art of vehicles of the tractor type and is particularly concerned with vehicles that accommodate various attachments for handling material, such as front end loaders, dozer blades, fork lifts, etc.

The use of self-propelled vehicles for handling material has been known for many years. In the past, such vehicles have been equipped with frames which have had the housing for drive train axle parts separately attached to the frame. For example, in conventionally designed frames there is a separate axle assembly which is bolted to the frame and is located under the main frame of the tractor.

It is highly desirable to provide a frame structure with a low center of gravity which at the same time maximizes the clearance under the tractor in order to reduce the height of the tractor and operator for safety purposes.

SUMMARY OF THE INVENTION

The present invention contemplates a frame structure for a vehicle that is to be used in handling material in which the frame structure has a low center of gravity, multi-dimensional rigidity, and in which the rear axle assembly may be housed in a portion of the frame structure.

The frame structure includes two spaced apart elongated side members, with each side member defining at least one aperture for allowing at least a portion of the drive train, such as axle shafts, to project therethrough. The two spaced apart side members are connected together by a plurality of cross members and a torsional cross member. The torsional cross member is secured to each of the side members in a position to at least partially encompass the apertures on the side members. The torsional cross member has components oriented substantially parallel to and substantially perpendicular to the length of the side members to provide multi-dimensional rigidity to the frame structure. The torsional cross member and side members define a housing in which at least another portion of the drive train may be disposed. In addition, a portion of the drive shaft is disposed in the housing and has a rotatable connection, e.g., through gears, with the axle shafts. The cross members are rigidly secured to the side members and are spaced along the length of the side members and from the torsional cross member to provide a rigid frame structure.

In its specific embodiment, the torsional cross member has end plates which are secured to the rear ends of the side members to define an integral extension thereof so that the entire cross member can be fabricated as a separate unit for increased rigidity.

BRIEF DESCRIPTION OF SEVERAL VIEWS OF DRAWINGS

FIG. 1 is a perspective view of a vehicle having the present invention incorporated therein;

FIG. 2 is a plan view of the frame of the present invention;

FIG. 3 is a side view of the frame of the present invention;

FIG. 4 is a perspective view of the rear portion of the frame of the present invention showing the torsional cross-member therein; and FIG. 5 is an enlarged cross-sectional view of the rear portion of the frame as viewed along line 5—5 of FIG. 4.

DETAILED DESCRIPTION

Figure 15:
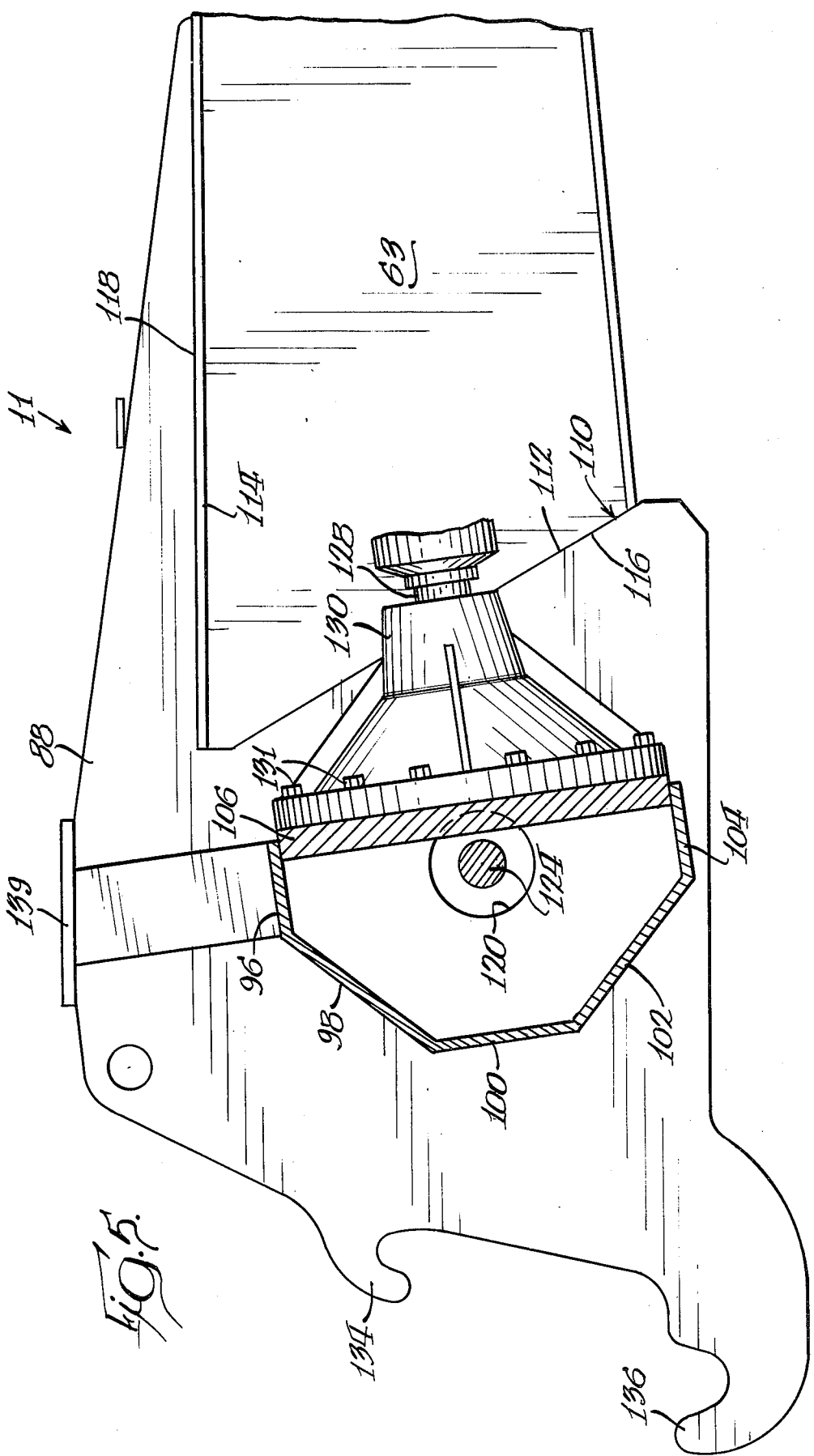

While this invention is susceptible of embodiment of many different forms, there is shown in the drawings and herein described in detail one specific embodiment, with the understanding that the present disclosure is to be considered as an exemplification of the principals of the invention and is not intended to limit the invention to the embodiment illustrated.

FIG. 1 of the drawings shows a vehicle generally designated by the reference numeral 10. Vehicle 10 consists of a frame structure 11 (shown in FIGS. 2–4), with a body 12 mounted thereon. Body 12 includes engine space 14 at the front end thereof, and operator space 16 which is disposed rearwardly of the engine space, and which is provided with a cab 17 for protecting the operator. Seat 18 is located within the operator space generally opposite a steering wheel 20. Front and rear pairs of ground engaging members or wheels 22 and 23 are rotatably supported on the frame structure.

Frame 11 further includes first and second upstanding members or stanchions 28 intermediate opposite ends thereof and on opposite sides of engine space 14. Lift arms 30 are pivotably mounted by pivot pins 32 on bearing members 34 (FIG. 3) adjacent the upper end of each stanchion 28. Pins 32 may be supported on forwardly extending brackets if desired, or on the stanchion itself.

Lift arms 30 extend forwardly along opposite sides of engine space 14 and a material handling member 38, illustrated as a bucket, is pivotably connected to the forward ends of lift arms 30 through pins (not shown). Material handling member 38 may take a variety of forms such as a dozer blade, scope, fork lift, etc. Lift arms 30 may be raised and lowered by fluid rams 40, each having one end pivotably connected to bearing members 42 on the lower ends of stanchions 28.

A second material handling member 44 may be advantageously disposed on the rear end of body 12. Material handling member 44, illustrated in the form of a backhoe, includes a boom 46 pivoted on frame 11 and a dipper-stick assembly 47 pivoted on boom 46 by a fluid ram. Dipper-stick assembly includes a bucket 50 pivoted by one or more fluid rams.

According to the present invention, frame structure 11 for vehicle 10, which is shown in FIGS. 2–5, includes two spaced-apart side members 62. Each of side members 62 is preferably generally U-shaped in cross section (FIG. 4), and includes a vertical side portion 63, upper flange 64 and lower flange 65. The U-shaped configuration provides for greater strength than would be the case in a flat member of the same weight, and flanges 64 and 65 provide anchoring sites for other parts of the body and engine which are secured thereto. Also, each side member 62 may have a reducing taper toward its front end 66 (FIG. 3). Side members 62 are joined by a plurality of cross-members which include front cross member 70 and rear cross-member 72, which will be discussed in more detail later.

Front cross-member 70 extends transversely between front ends 66 of side members 62. Cross member 70 includes front and rear longitudinally spaced transversely extending plates 74 and 76 which respectively have opposite ends rigidly secured to side members 62, by welding. The lower ends of plates 74 and 76 have longitudinally aligned openings 78 which provides a support for front axle assembly 79 (FIG. 1) so that front axle assembly 79 can pivot about a longitudinal axis as is well known in the art. To further rigidify cross member 70, horizontal plates 80 may be located between front and rear plates 74, 76 and welded thereto and also welded to side members 62.

According to the present invention, rear cross member 72, not only provides an interconnection between side members 62 but also houses the drive train for the vehicle. For this purpose rear cross member includes a pair of identical end members 88 interconnected by a hollow torsional cross member 90 and the end members are secured to side members 62 as will be explained later. Torsional cross member 90 provides multi-dimensional rigidity to frame structure 11 at the rear end because it has components oriented substantially parallel to and substantially perpendicular to the length of side members 62, and these edges are rigidly secured to each of side members 62 through end members by welding. Torsional cross-member 90 is secured to each side member 62 at a location which allows torsional cross-member to enclose the rear axle assembly.

As is best shown in FIGS. 4 and 5, torsional cross-member 90 comprises a plurality of integrally connected substantially rectangular sections, including top section 96, first intermediate section 98, second intermediate section 100, third intermediate section 102, bottom section 104, and front plate 106. Top section 96 has its edges disposed substantially parallel to the longitudinal axis of each side member 62, and preferably inclined at an angle of about 5 degrees therewith. First intermediate section 98 depends downwardly from and rearwardly of the top section. Second intermediate section 100 depends downwardly from first intermediate section and is substantially transverse to top section 96. Third intermediate section 102 depends downwardly from second intermediate section 100 and forwardly thereof. Bottom section 104 extends forwardly from the third intermediate section and is substantially parallel to the top section. A substantially planar front plate 106 is secured to the front side of top section 96 and bottom section 104 so that front plate 106, above enumerated sections 96, 98, 100, 102 and 104, and end members 88, cooperate to define a substantially liquid-impervious enclosed inner area, which may provide a housing for the rear axle assembly of tractor 10.

According to one aspect of the invention, end members 88 are formed in a unique fashion and define an integral extension of side members 62 as shown in FIGS. 4 and 5, each end member 88 consists of a flat plate that has a generally L-shaped recess 110 at the forward end thereof. Recess 110 defines an upwardly and rearwardly inclined vertical edge 112 and a generally horizontal edge 114. Edges 112 and 114 are in extended engagement with corresponding edges 116 and 118 respectively on the free end of vertical side portion 63 and upper flange 64 and are welded thereto along the entire length thereof. Thus, the edges cooperate to define load supporting edges between side members 62 and cross member 72.

Each end member 88 has an opening 120 aligned with the chamber defined by torsional cross member 90 and cooperates therewith to define an enclosed sealed chamber for a rear axle assembly. The rear axle assembly may be any rear axle assembly which is well known to those skilled in the art, and generally includes axle shafts 124 that are rotatably supported in torsional cross member 90 and have gears (not shown) at their inner ends. The gears at the inner ends of axle shafts 124 are in mesh with a gear connected to drive shaft 128 (see FIGS. 4 and 5) rotated in a housing 130 secured to front plate 106 by bolts 131, or the like. As is shown in FIG. 4, the rear axle assembly may be provided with individual gear assemblies in housings 132, such as David Brown Housing 132, for each of rear wheels 22, and such gear assemblies are well known to those skilled in the art.

In the preferred embodiment of the invention, each end member 88 is generally irregularly shaped, and has vertical dimensions which are greater than the vertical dimension of each side member 62. The rear portion of each end member 88 is provided with ears 134 and 136 that define a slot or notch for receiving a cross member which may support the rear material handling unit. End members 88 may also have brackets 138 which may provide further anchoring sites for components of the vehicle. Torsional cross member 90 may also have a mounting assembly 139 for supporting part of cab 17.

As is mentioned previously, each side member 62 or frame 11 is provided with a stanchion 28. Stachion 28 is secured to each side member 62, such as by welding, bolts, lugs, or the like, to rigidly affix stanchion 28 to each side member 62. To further rigidify the entire frame between side members 62 the upper ends of stanchions 28 may be interconnected by a horizontal plate or cap 140. In addition, each stanchion 28 is provided with several brackets 142 for securing part of body 12 to the stanchions.

The frame structure of the present invention has several advantages over frame structures of the prior art. By serving the dual purpose of supplying the necessary rigidity to the frame structure, and at the same time providing an enclosed housing for attaching axle assembly components, the torsional member of the frame structure provides the same advantages previously achieved by the use of two separate components. This makes it possible to produce a frame structure with a low center of gravity which has a maximum clearance under the vehicle. In addition, the serviceability of a tractor which incorporates the frame structure is improved since the outer portions of the drive mechanism, i.e., brakes, planetaries, stub axles, etc., can be removed while the main portion of the differential, axle shafts, etc., can remain intact. Also, because the axle housing is a structural member, it can be the anchor point of other parts of the tractor, such as fenders, cabs, floor boards, and seat arrangements. Also, the torsional cross member serves as a reservoir or liquid impervious enclosed area for the required oil to lubricate the gears incorporated therein the differential and/or transmission. Finally, because the torsional cross member serves the same functions as were performed by two separate members in prior art frames, the frame structure of the present invention may be lighter than prior art frames. Consequently, tractors incorporating the present invention may be lighter than was previously possible, and thus will make more efficient use of fuel.

The frame structure 11 of the present invention may be used in a wide variety of vehicles, but is most advantageously used in material handling vehicles such as tractors, and the like. Such vehicles may be equipped with material handling members on either the front end, the back end, or on both the front and back end of the vehicle. Although the torsional cross member of the frame structure of the present invention has been described in terms of its preferred embodiment, i.e., as being formed of integral planar members, the torsional cross member of the present invention includes torsional cross member having any shape, so long as the torsional cross member have components which are disposed generally horizontally and generally perpendicularly with respect to the length of the side members of the frame structure. Thus, the torsional cross member could be a substantially cylindrically shaped tubular structure secured to the side members along its edges, or any other suitable shape meeting the requirements of the aforementioned description. The respective sections could also be formed separately and be welded together to define torsional cross member 90.

It will also be appreciated that, if desired, end members 88 could be formed as an integral part of vertical side portion 63 and the appended claims are intended to cover such variations.

I claim:

1. A frame structure for a vehicle having at least one pair of wheels and a drive train between said wheels and an engine comprising:
two spaced apart elongated side members, each side member defining at least one aperture for allowing at least a portion of said drive train to project therethrough,
a torsional cross member extending between said side members having free edges secured to each of the side members to at least partially encompass said aperture, said torsional cross member having components including at least two planar members permanently interconnected along adjacent edges and defining an included angle of more than 90 degrees to provide multi-dimensional rigidity to the frame structure, the torsional cross member and side members defining a housing with at least another portion of said drive train disposed in said housing; and
at least one cross member rigidly secured to the side members in spaced relationship with said torsional cross member to provide a rigid frame structure.

2. The frame structure of claim 1 wherein the torsional cross member is disposed rearwardly of the frame structure.

3. The frame structure of claim 2 wherein the torsional cross member comprises a plurality of integrally connected sections, said sections completely encompassing said aperture.

4. The frame structure of claim 3 wherein said housing is substantially impervious to lubricants.

5. A frame structure for a vehicle having at least one pair of wheels with a drive train between said wheels and an engine comprising:
two spaced apart elongated side members, each side member defining at least one aperture for allowing at least a portion of said drive train to project therethrough,
a torsional cross member extending between said side members having free edges secured to each of the side members to at least partially encompass said aperture, said torsional cross member having components oriented substantially parallel to and substantially perpendicular to the length of the side members to provide multi-dimensional rigidity to the frame structure, the torsional cross member and side members defining a housing with at least another portion of said drive train disposed in said housing;
at least one cross member rigidly secured to the side members in spaced relationship with said torsional cross member to provide a rigid frame structure, and wherein the torsional cross member comprises a plurality of integrally connected substantially rectangular sections;
a top section having its edges disposed substantially parallel to a longitudinal axis of said side members, a first intermediate section depending downwardly from and rearwardly of the top section, a second intermediate section depending downwardly from first intermediate section, a third intermediate section depending downwardly from the second intermediate section and forwardly thereof, a bottom section having its edges extending forwardly from the third intermediate section and substantially parallel to the top section, and a substantially planar member secured to the front side of the top section and the bottom section to define a substantially liquid-impervious enclosed area, said area enclosing a part of said drive train and a lubricant therefor, and means for enclosing another portion of the drive train secured to the outer surface of the substantially flat member.

6. The frame structure of claim 5 wherein stanchion means for supporting a plurality of lift arms are disposed on each of the side members intermediate said torsional cross member and said at least one cross member.

7. The frame structure as defined in claim 6, in which each side member includes a separate end member with the respective free edges of said torsional cross member secured to the respective end members.

8. A frame structure for a vehicle having at least one pair of wheels with a drive train between said wheels and an engine comprising; two transversely spaced elongated members each having a forward end and a rear end with each rear end having a lower inclined surface with respect to a longitudinal axis and an upper surface extending generally parallel to said longitudinal axis, a torsional cross member extending transversely of said side members and having end members respectively aligned with said side members, said end members each having an inclined surface and a further surface respectively in extended engagement with the respective inclined surfaces and upper surfaces of respective side members, said torsional cross member having components oriented substantially perpendicular and substantially parallel to said longitudinal axis to provide multi-dimensional rigidity to said frame structure; and at least one cross member rigidly secured to said side members in spaced relation to said torsional cross member to provide a rigid frame structure.

* * * * *